US006698836B1

United States Patent
Veneruso

(10) Patent No.: US 6,698,836 B1
(45) Date of Patent: Mar. 2, 2004

(54) MECHANISM TO OBTAIN THE COMPLETE RECLINING OF A SEAT, PARTICULARLY FOR AN AIRCRAFT SEAT

(75) Inventor: Alberto Veneruso, Tor Tre Ponti (IT)

(73) Assignee: Aviointeriors S.p.A., Tor Tre Ponti (IT)

( * ) Notice: Subject to any disclaimer, the term of this patent is extended or adjusted under 35 U.S.C. 154(b) by 0 days.

(21) Appl. No.: 10/228,809

(22) Filed: Aug. 26, 2002

(51) Int. Cl.$^7$ ................................................ B60N 2/02
(52) U.S. Cl. ........................... 297/354.13; 297/423.26; 297/354.1
(58) Field of Search .................... 297/354.1, 354.12, 297/354.11, 354.13, 330, 452.18, 84, 423.24, 423.23, 423.26, 423.3, 423.27

(56) References Cited

U.S. PATENT DOCUMENTS

| | | | | |
|---|---|---|---|---|
| 4,470,634 A | * | 9/1984 | Delius et al. | 297/423.19 |
| 5,352,020 A | * | 10/1994 | Wade et al. | 297/423.26 |
| 5,560,681 A | * | 10/1996 | Dixon et al. | 297/284.11 |
| 5,636,898 A | * | 6/1997 | Dixon et al. | 297/316 |
| 5,806,920 A | * | 9/1998 | Blount | 297/68 |
| 5,882,075 A | * | 3/1999 | Partington et al. | 297/344.13 |
| 6,095,610 A | * | 8/2000 | Okajima et al. | 297/423.36 |
| 6,305,644 B1 | * | 10/2001 | Beroth | 244/118.5 |
| 6,352,309 B1 | * | 3/2002 | Beroth | 297/354.13 |
| 6,494,536 B2 | * | 12/2002 | Plant | 297/284.11 |

FOREIGN PATENT DOCUMENTS

| | | |
|---|---|---|
| EP | 0957025 | 11/1999 |
| EP | 1074468 | 2/2001 |
| GB | 2326824 | 1/1999 |

* cited by examiner

*Primary Examiner*—Peter M. Cuomo
*Assistant Examiner*—Erika Garrett
(74) *Attorney, Agent, or Firm*—Samuels, Gauthier & Stevens

(57) ABSTRACT

The invention concerns to a mechanism to obtain the complete reclining of a seat, particularly for an aircraft seat, comprising a lower element (3), fixed to the floor, provided with a guide, placed in a substantially rear position; a seat element (7), on which the back (1) and the seat (2) are pivoted, respectively on. the rear and frontally, a rocking lever element (12), pivoted in front of said lower element (3), and above the lower part of said seat element, (7); and a lever element (16), pivoted, at its rear end (17), on the coupling point (12) between the seat (7) and the back (1), and at its front end (18), on said rocking lever (12); being further provided actuating means (14) that, acting on the rocking lever, cause the operation of the whole mechanism, reclining or lifting the seat.

5 Claims, 7 Drawing Sheets

MECHANISM TO OBTAIN THE COMPLETE RECLINING OF A SEAT, PARTICULARLY FOR AN AIRCRAFT SEAT

The present invention concerns a mechanism to obtain the complete reclining of a seat, particularly for an aircraft seat.

More specifically, the invention concerns a mechanism of the above kind that allows creating a "bed" condition with a very limited space.

The solution suggested according to the present invention has been particularly studied for "business" class seats.

It is well known that in aircraft seat for the economic, business and in many cases first class are provided.

In order to obtain the best comfort, many technical solutions have been studied, particularly for business and first class. Obviously, it easier to find solutions for the first class seats, since the available space is really larger, while it is more difficult to obtain certain results for the business class seats.

More particularly, it is not easy to obtain a "bed" condition for "business" class seat, mainly due to the reduced available space.

The solution suggested according to the present invention is included in this context.

Particularly, main object of the present invention is that of providing a mechanism for completely reclining a seat, up to reaching a bed position, with the minimum space.

Further object of the present invention is that of providing a solution of the above kind that allows to reach a "bed" solution without discontinuities on the plane where the passenger rests.

Still another object of the present invention is that of providing a mechanism which is very simple under a constructive point of view, ad, at the same time, easy and reliable.

A further object of the present invention is that of providing a technical solution excluding the presence of in vista guides.

It is therefore specific object of the present invention a mechanism to obtain the complete reclining of a seat, particularly for an aircraft seat, comprising a lower element, fixed to the floor, provided with a guide, placed in a substantially rear position; a seat element, on which the back and the seat are pivoted, respectively on the rear and frontally, a rocking lever element, pivoted in front of said lower element, and above the lower part of said seat element; and a lever element, pivoted, at its rear end, on the coupling point between the seat and the back, and at its front end, on said rocking lever; being further provided actuating means that, acting on the rocking lever, cause the operation of the whole mechanism, reclining or lifting the seat.

According to the invention, it is provided a lifting mechanism for the seat footrest.

Still according to the invention, two different mechanisms for each seat can be provided.

Furthermore, according to the invention, said rocking lever actuating means can be comprised by mechanical, hydraulic, pneumatic, hydropneumatic actuating means.

In a preferred embodiment of the mechanism according to the present invention, said seat element provides at the back, two pivoting means for the back, and two coupling points, respectively upper and lower point, for the coupling of the seat.

The present invention will be now described, for illustrative but not limitative purposes, according to its preferred embodiments, with particular reference to the figures of the enclosed drawings, wherein.

Figure 1:
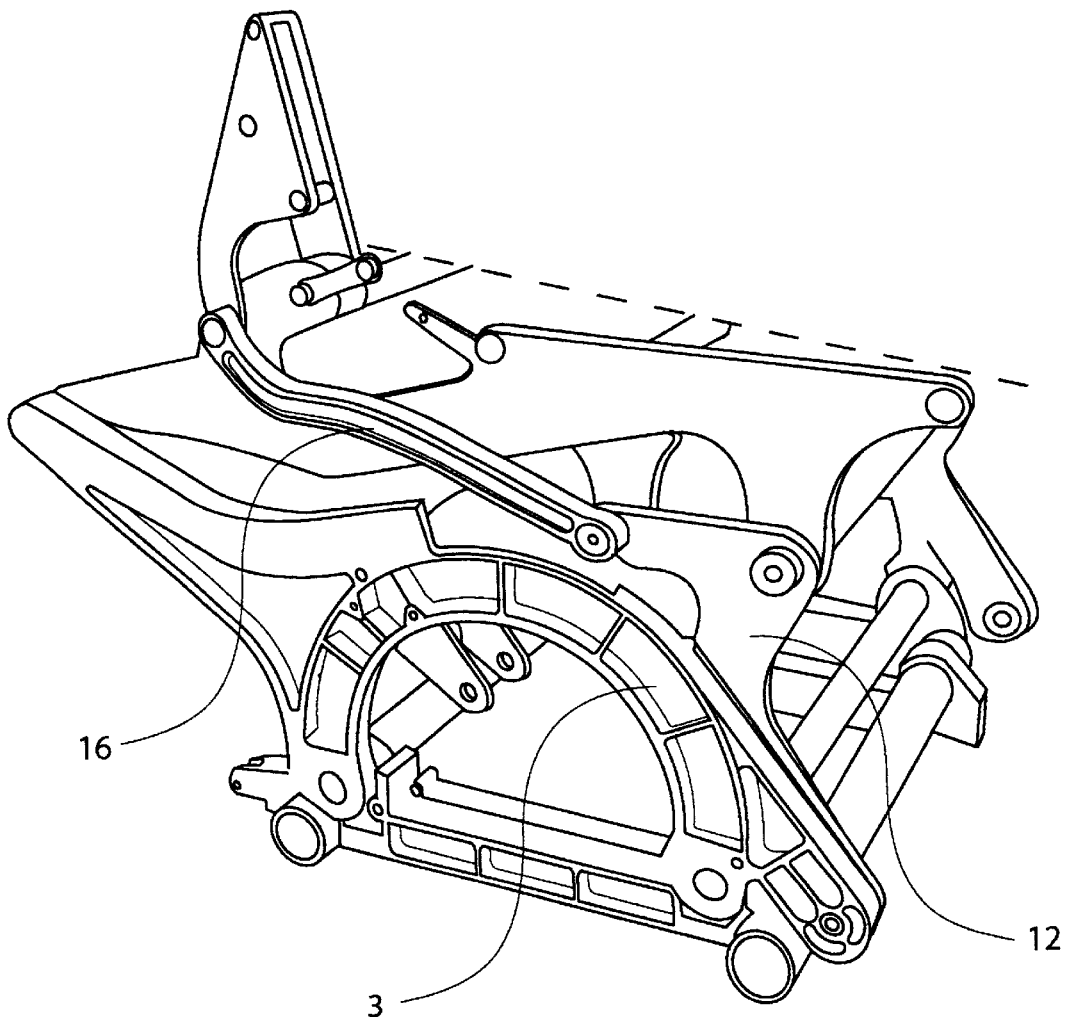
FIG. 1 is a perspective view of a mechanism according to the invention.
Figure 2:
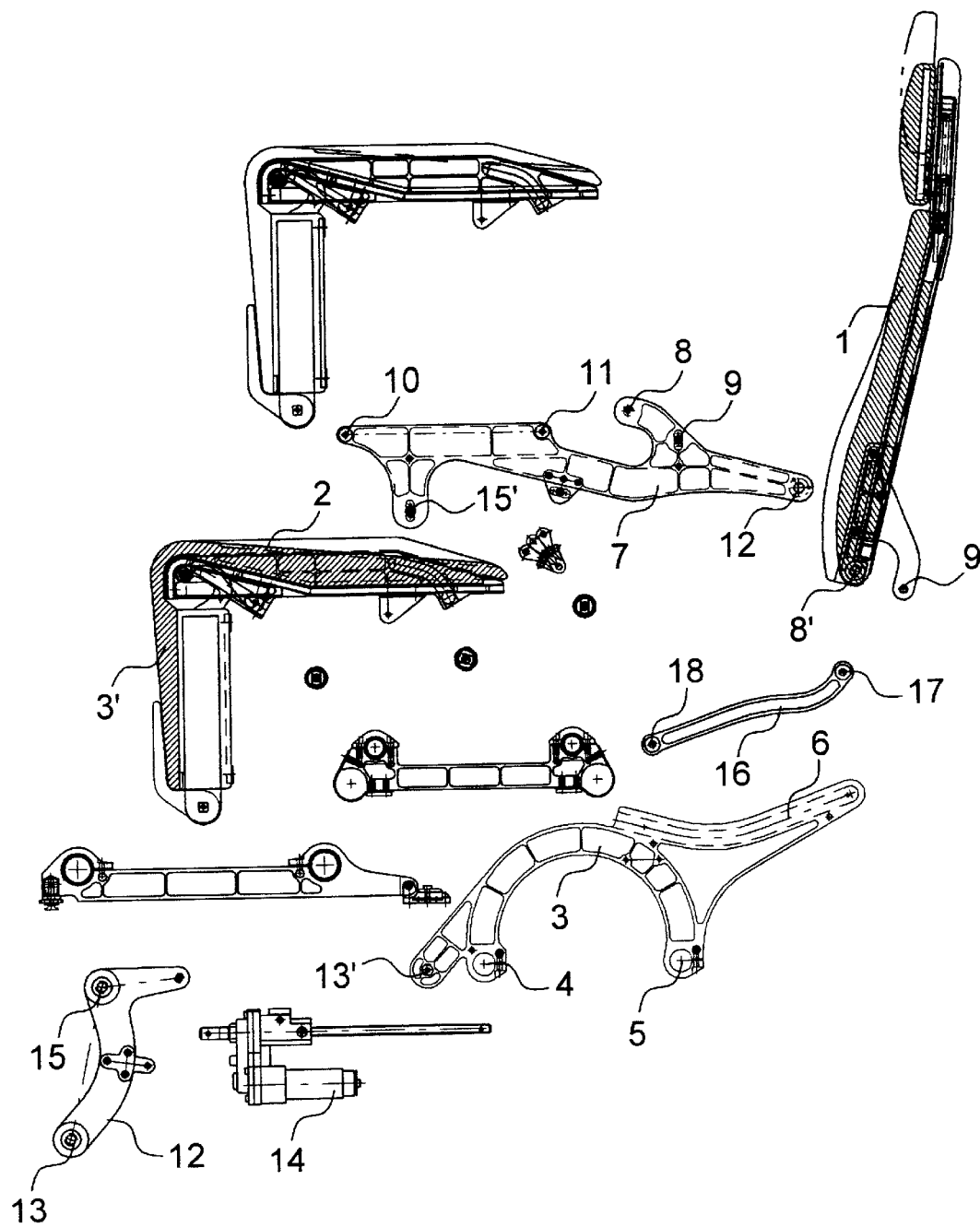
FIG. 2 is an exploded view of the elements of the mechanism according to the invention.
Figure 3A:
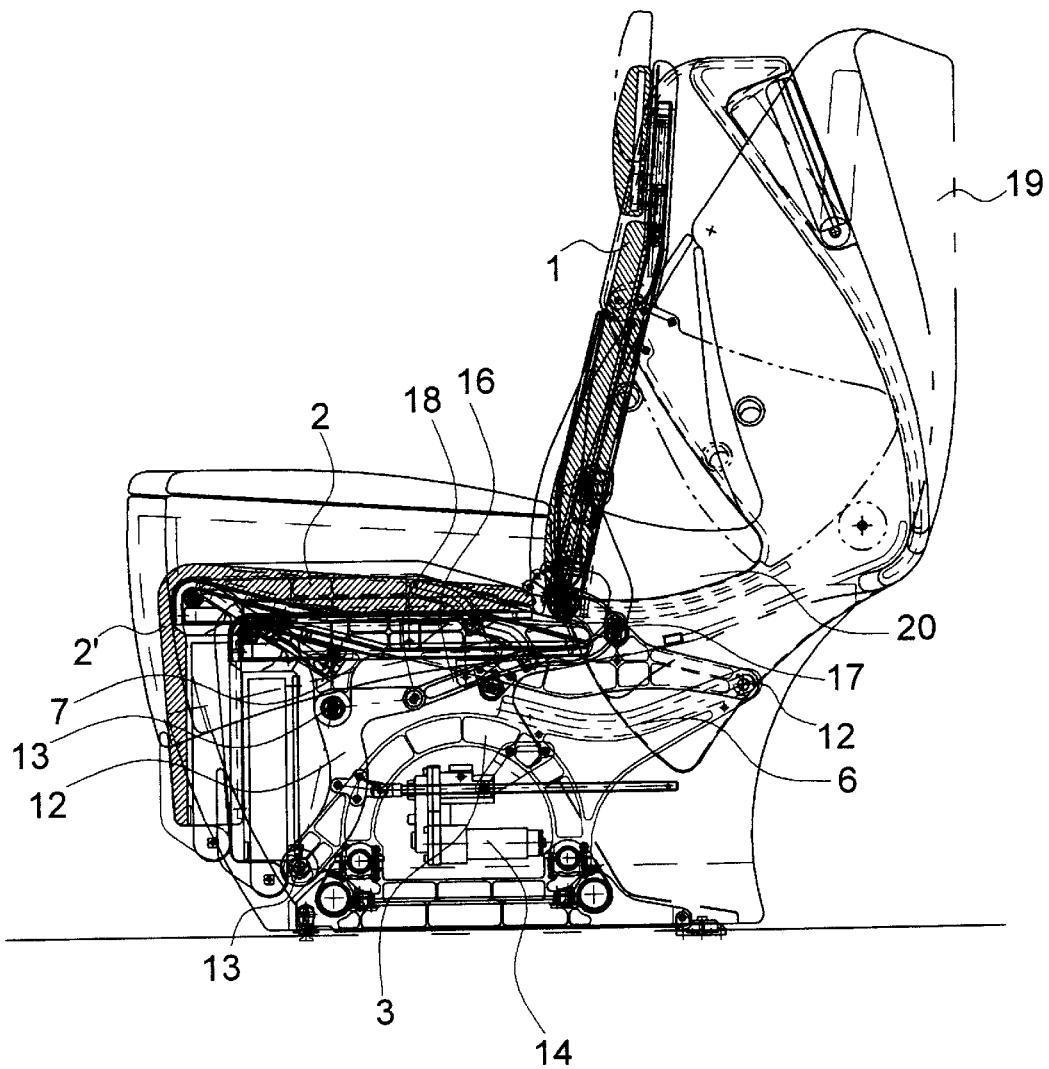
FIGS. 3a–3e show the different positions of a seat provided with a mechanism according to the invention, with the same mechanism shown.
Figure 3B:
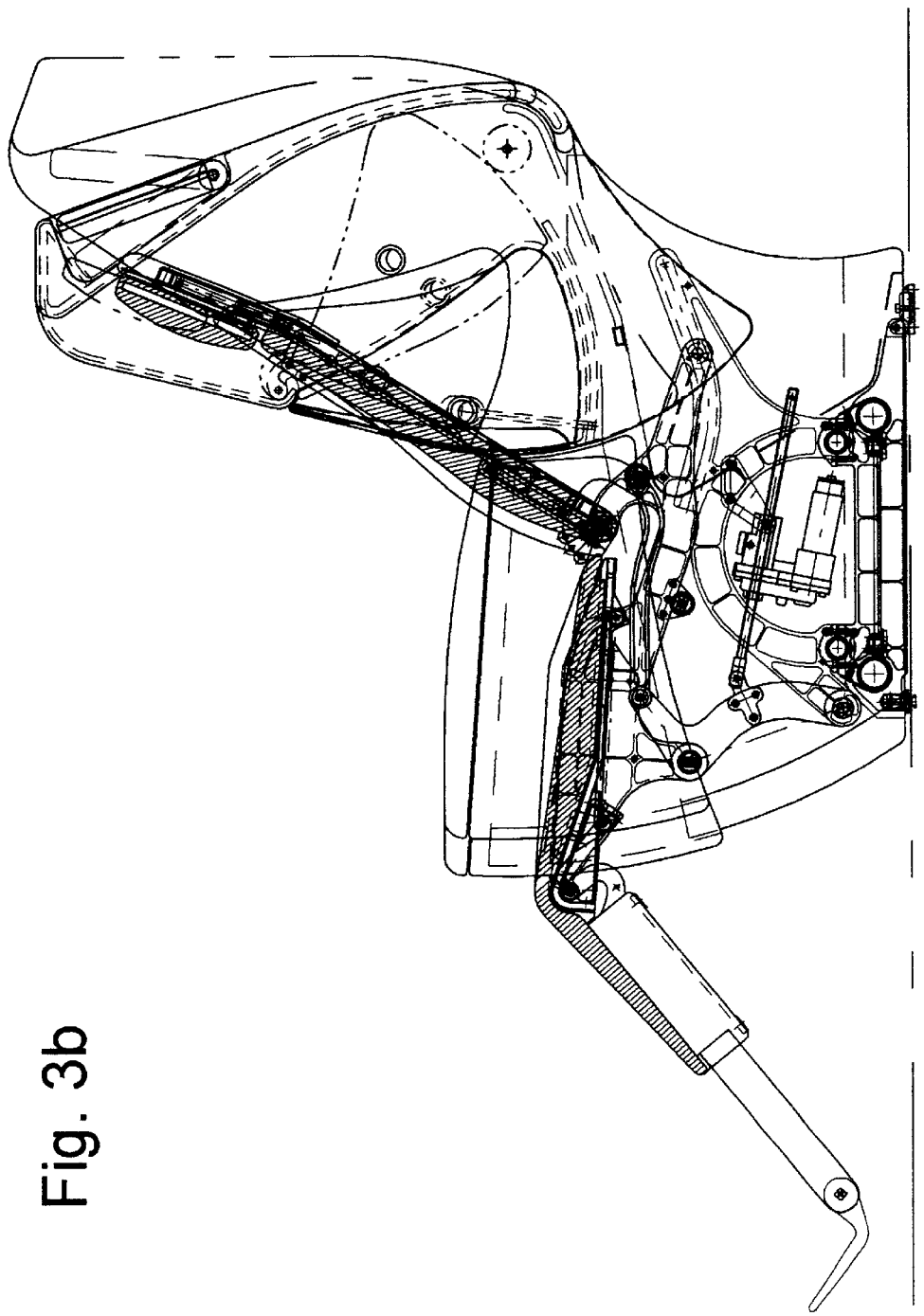
Figure 3C:
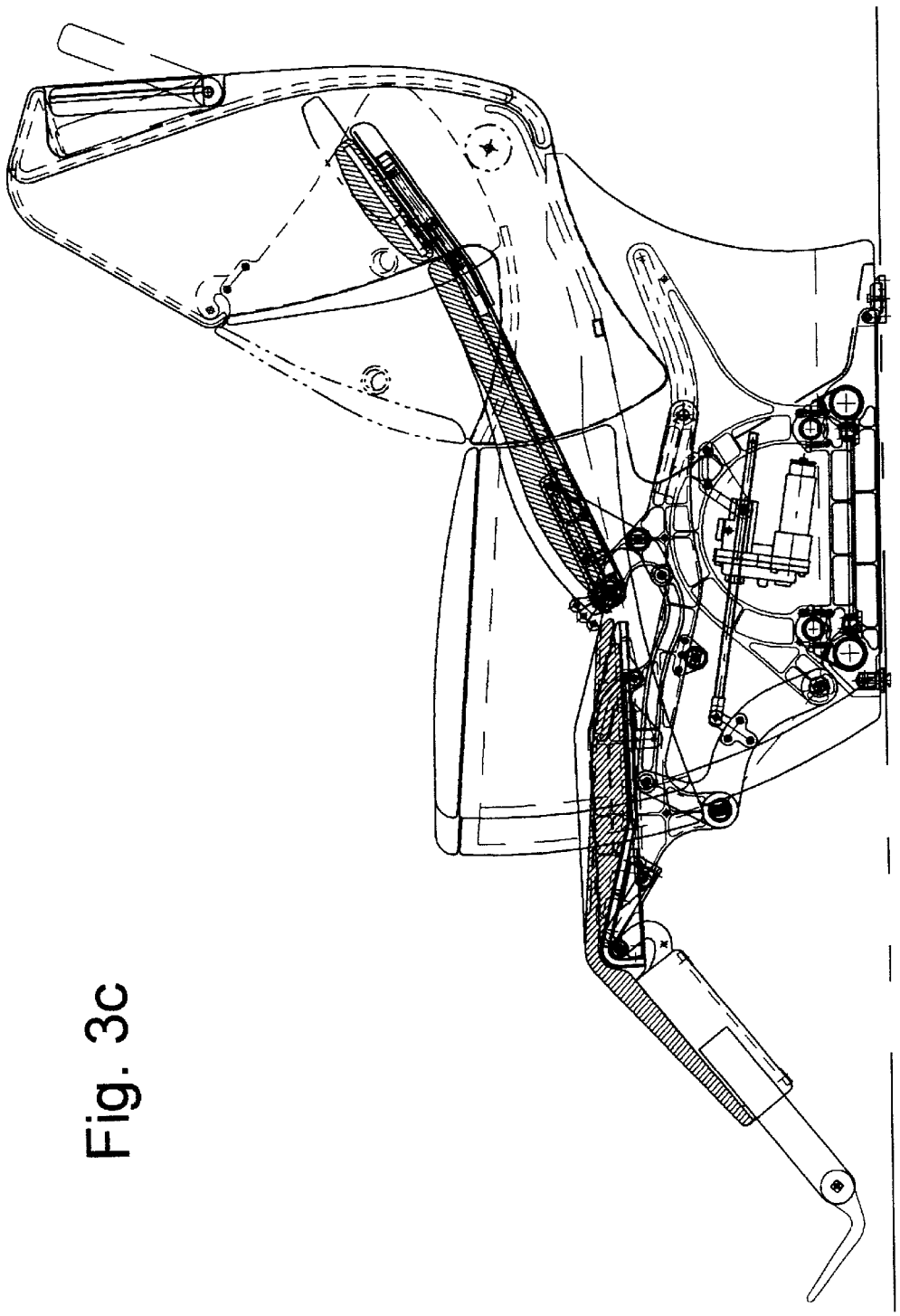
Figure 3D:
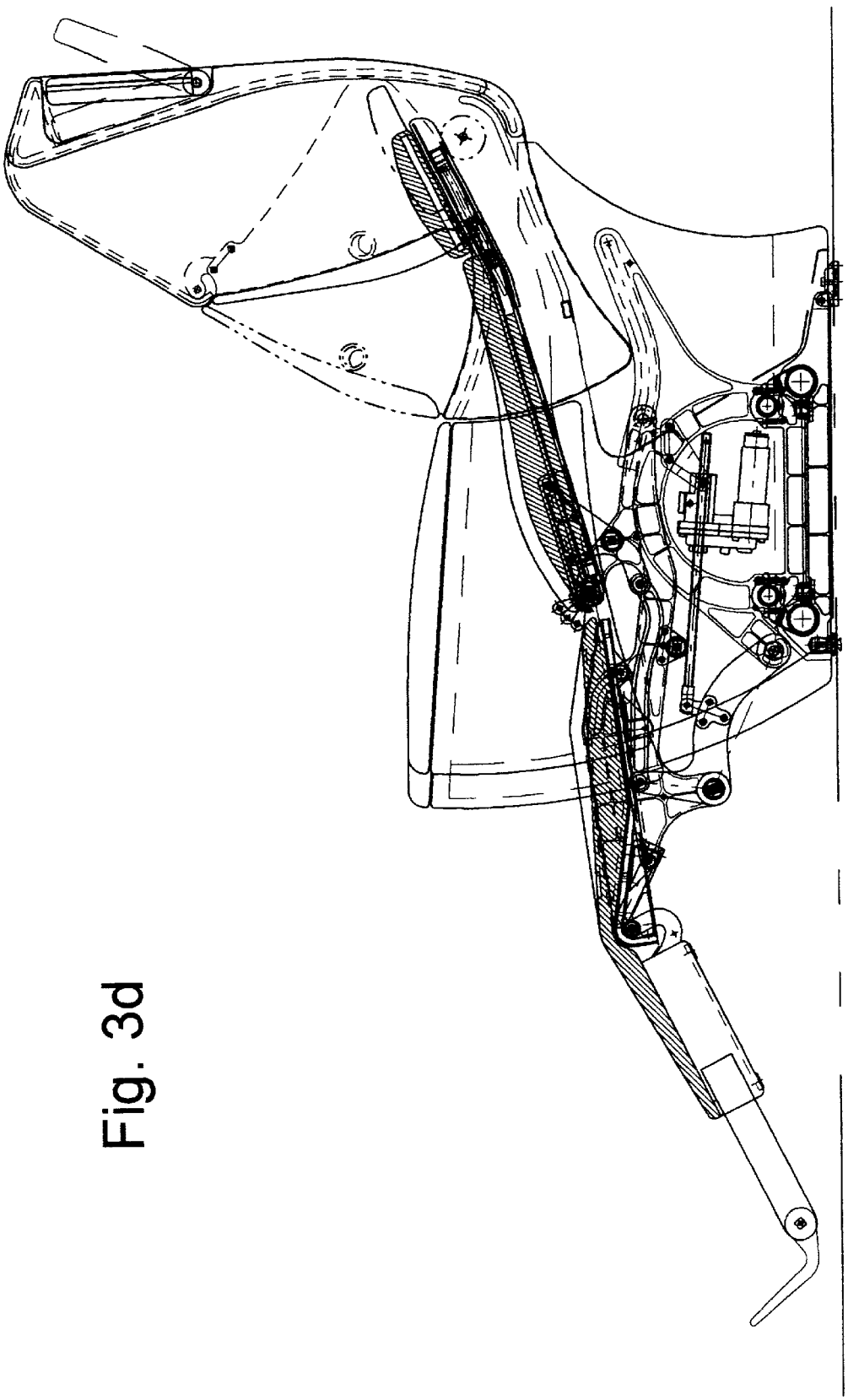
Figure 3E:
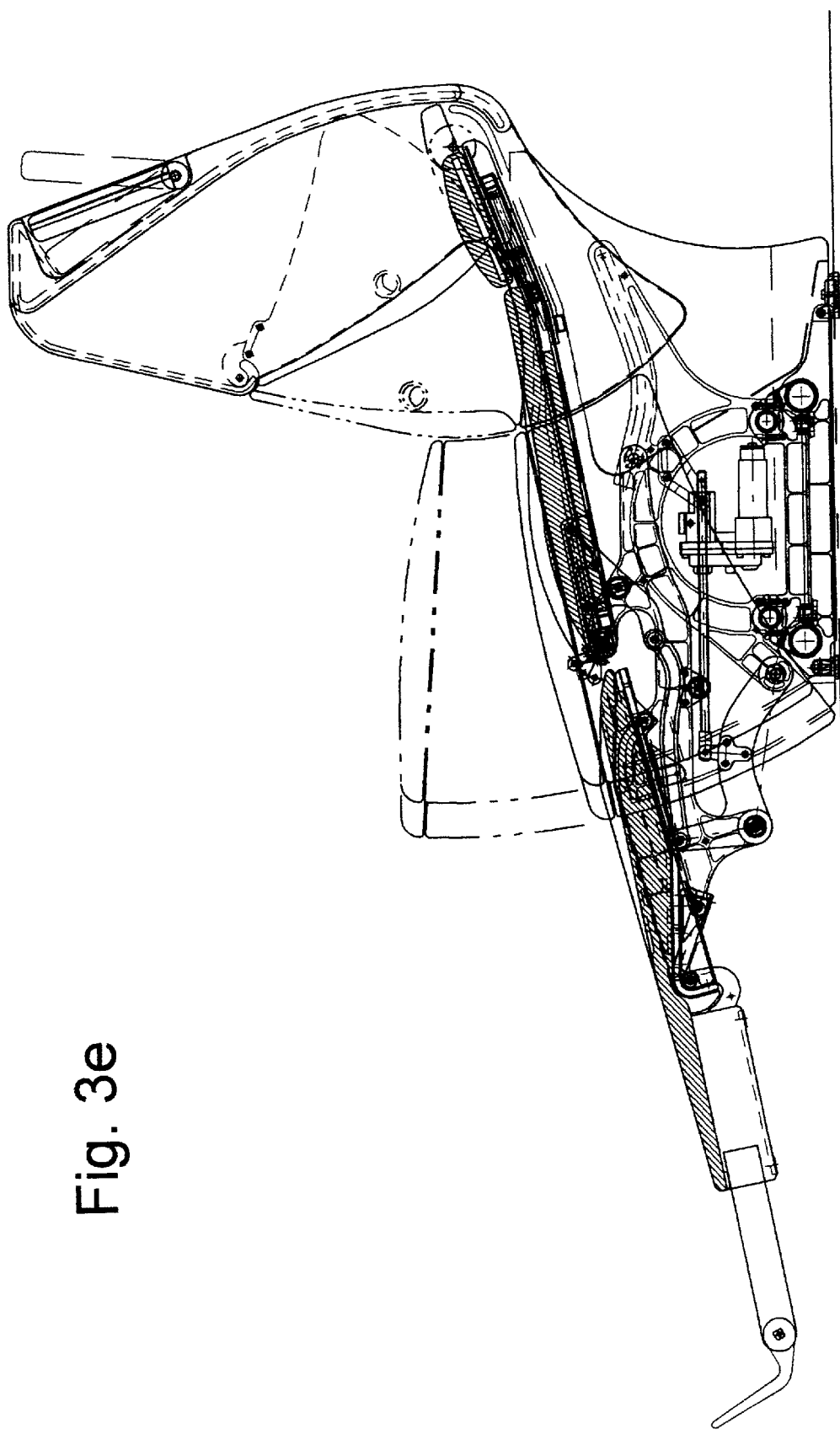

Observing the enclosed figures, and at first FIGS. 1 and 2, a back 1 and a seat 2, provided with footrest 2', are shown, besides the other parts of the mechanism according to the invention.

Particularly, said mechanism provides an element 3, provided with fixing points 4 and 5 for fixing the lower bars of the seat to the floor, and with a guide 6, the function of which for the mechanism according to the invention will be evident in the following.

Element 7 for the seat is pivoted at the back, in the points indicated by the reference numbers 8 and 9, to the points 8' and 9' of the back 1, while it is coupled to the seat 2 in correspondence of points 10, 11. Furthermore, element 7 is, at the back provided with a pin 12 slidable along the guide 6 of the element 3.

A front rocking lever 1 2 is provided at the bottom and at the front with respect to the element 3, coupled to the same in correspondence of points 13 and 13', and on which an actuator 14 acts, said actuator being a hydraulic, pneumatic, hydro-pneumatic actuator.

Said rocking lever 1 2 is further pivoted in the point indicated by reference number 15 to the corresponding. point 15' of the element 7.

It is further provided a connection lever 16, pivoted at its rear end at point 9–9', and at the other front end 18 pivoted at point 18' of the rocking lever 12.

Observing now also FIGS. 3a–3f, it can be observed the working of the mechanism according to the present invention.

Acting on the actuator 14, the rotation of the rocking lever 12 about the pivoting point 13 on the lower element 3 is induced.

Rocking lever 12 moves forward with respect to the seat, thus thrusting forward the seat element 7, thanks to the pivoting 15, 15', advancing also in view of the motion of the connection lever 16 along the guide 6 of the lower element 3.

The motion of the mechanism proceeds up to reaching the "bed" position of FIG. 3f.

In the embodiment shown in the drawings, a double mechanism according to the invention is provided for each seat, even if the solution could provide only one mechanism for reclining the seat.

At the same time, the footrest 2' lifts, in view of a mechanism of the traditional kind, that will be not further described, since it is not specific object of the invention.

In the embodiment shown in the enclosed figures, the seat further provides some structural features, which are the subject matter of a separated patent application filed on the same date, and particularly a rear body 19 that, during the reclining operation, opens to allow the seat movement.

It further provided a panel 20 that, when opened, allows to obtain a bigger space for the shoulders.

Furthermore arms 21 are provided, being it possible to lower said arms in order to obtain, if wished, a spatial continuity wit the adjacent seat.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A mechanism for obtaining the complete reclining of a seat and a back, comprising a lower element, fixed to a floor, provided with a guide, placed in a rear portion of said lower element, said lower element having a front and rear portion on which the back and the seat are pivotally mounted thereon, a seat element having a lower part and coupled to said lower element, a rocking lever pivotally secured to said front portion of said lower element, and above the lower part of said element; and a lever element, pivoted, at its rear end, on a coupling point between the seat and the back, and at its front end, on the rocking lever; being further provided actuating means that, acting on the rocking lever, cause operation of the whole mechanism, reclining or lifting the seat.

2. The mechanism according to claim 1, wherein it is provided a lifting mechanism for the seat footrest.

3. The mechanism according to claim 1, wherein two different mechanisms for each seat are provided.

4. The mechanism according to claim 1, wherein said rocking lever actuating means are comprised by mechanical, hydraulic, pneumatic, hydropneumatic actuating means.

5. The mechanism according to claim 1, wherein said seat element provides at the back two pivoting means for the back, and two coupling pioints, respectively upper and lower point, for the coupling of the seat.

* * * * *